US012604150B2

(12) United States Patent
Delikaris Manias

(10) Patent No.: US 12,604,150 B2
(45) Date of Patent: Apr. 14, 2026

(54) METHOD AND SYSTEM FOR SPATIAL AUDIO PROCESSING USING MULTIPLE ORDERS OF AMBISONICS

(71) Applicant: Apple Inc., Cupertino, CA (US)

(72) Inventor: Symeon Delikaris Manias, Playa Vista, CA (US)

(73) Assignee: Apple Inc., Cupertino, CA (US)

( * ) Notice: Subject to any disclaimer, the term of this patent is extended or adjusted under 35 U.S.C. 154(b) by 260 days.

(21) Appl. No.: 18/476,280

(22) Filed: Sep. 27, 2023

(65) Prior Publication Data

US 2025/0106579 A1 Mar. 27, 2025

(51) Int. Cl.
*H04S 7/00* (2006.01)
*H04R 5/04* (2006.01)

(52) U.S. Cl.
CPC ................ *H04S 7/30* (2013.01); *H04R 5/04* (2013.01); *H04S 2420/11* (2013.01)

(58) Field of Classification Search
None
See application file for complete search history.

(56) References Cited

U.S. PATENT DOCUMENTS 10,798,511 B1 10/2020 Sheaffer et al.
11,322,164 B2 * 5/2022 Kjoerling .............. G10L 19/008
2009/0316913 A1 * 12/2009 McGrath .................. H04S 3/02 381/20

OTHER PUBLICATIONS

Cobos et al., "An Overview of Machine Learning and Other Data-Based Methods for Spatial Audio Capture, Processing, and Reproduction", received from https://asmp-eurasipjournals.springeropen.com/articles/10.1186/s13636-022-00242-x, May 16, 2022, 21 pages.

* cited by examiner

*Primary Examiner* — Paul W Huber
(74) *Attorney, Agent, or Firm* — Aikin & Gallant, LLP

(57) ABSTRACT

A method that includes receiving a higher-order ambisonics (HOA) representation of a sound field that includes a first plurality of audio signals, separating a second plurality of audio signals from the first plurality of audio signals that are associated with a first-order ambisonics (FOA) representation of the sound field, determining a plurality of adaptive filters based on at least some of the second plurality of audio signals, producing a plurality of output audio signals based on the first plurality of audio signals and the plurality of adaptive filters, each output audio signal having at least a portion of the sound field, and driving a plurality of speakers using the plurality of output audio signals.

20 Claims, 5 Drawing Sheets

METHOD AND SYSTEM FOR SPATIAL AUDIO PROCESSING USING MULTIPLE ORDERS OF AMBISONICS

FIELD

An aspect of the disclosure relates to a system that processes spatial audio using higher-order ambisonics (HOA) and first-order ambisonics (FOA) of the HOA. Other aspects are also described.

BACKGROUND

Ambisonics is a surround sound format in which a sound field may be represented by a summation of spherical harmonic functions. As the spherical harmonic functions are extended to include higher-order elements (order of two and higher), the representation of the sound field may become more detailed, thereby having a higher spatial resolution during spatial reproduction of the sound field. The term higher-order ambisonics ("HOA") may be used to generically refer to such a representation of the sound field.

SUMMARY

An aspect of the disclosure may include a method and a system for spatial audio processing using multiple orders of ambisonics. A higher-order ambisonics (HOA) representation of a sound field that includes a first group of audio signals (or audio data representing audio signals) may be received, and a second group of audio signals may be separated from the first group that are associated with a first-order ambisonics (FOA) representation of the sound field. In particular, since the HOA representation includes a summation of all of the previous orders (e.g., a $2^{nd}$ order HOA representation having the FOA and the $0^{th}$ order), the system may split (extract) the FOA data from the HOA data. The system determines adaptive filters based on at least some of the audio signals of the HOA representation. In particular, the system may perform a sound field analysis upon the second group of audio signals to determine one or more parameters associated with the sound field. In one aspect, the parameters may include at least one of a direction of arrival (DOA) associated with a sound source of the sound field, diffuseness of the sound field, reverberance of the sound field, and direct-to-ambience ratio of sound of the sound field. The system may determine the filters based on (or using) the parameters and signals of the HOA representation. The system produces several output audio signals based on the first group of signals and the adaptive filters, where each of the output audio signals may have at least a portion of the sound filed. The system may drive several speakers using the output audio signals.

In one aspect, producing the output audio signals includes rendering the first group of audio signals to produce a group of speaker driver signals and applying at least one of the adaptive filters to at least one of the speaker driver signals. In another aspect, the system determines a speaker layout of the speakers, where the audio signals are rendered according to the speaker layout. In some aspects, when the speaker layout includes headphones, rendering further comprises applying at least one spatial filter to each of the output audio signals. In another aspect, the adaptive filters are determined according to the speaker layout of the speakers.

In one aspect, the HOA representation of the sound field is of user-desired audio content (e.g., a musical composition), the system plays back, by an electronic device, the user-desired audio content through the speakers, where the receiving, separating, determining, producing, and driving are performed while the user-desired audio content is played back by the electronic device.

In another aspect, the output audio signals is a first group of output audio signals, the system further includes determining that the adaptive filters are no longer to be determined, in response, rendering the second group of audio signals to produce a second group of output audio signals, and driving the speakers using the second group of output audio signals in lieu of the first group of output audio signals. In one aspect, the method described herein may be performed by at least one programmed processor of an electronic device, where the method may also include determining a computational load on the electronic device, where determining that the filters are no longer to be determined includes determining that the computational load is above a threshold.

Another aspect of the disclosure is a processor configured to perform operations described herein. Another aspect of the disclosure is an electronic device as shown and as described herein.

According to another aspect of the disclosure is an electronic device that includes at least one processor and memory having instructions stored therein which when executed by the at least one processor causes the electronic device to receive a HOA representation of a sound field that includes a first group of audio signals; extract a second group of audio signals from the first group of audio signals, where the second group of audio signals are of a FOA representation of the sound field; determine a group of adaptive filters based on at least some of the second group of audio signals; produce a group of output audio signals based on the first group of audio signals and the group of adaptive filters, each output audio signal having at least a portion of the sound field; and drive a group of speakers using the group of output audio signals.

In one aspect, the speakers may be a part of (integrated with or into) the electronic device, which may be a headset or one or more loudspeakers, where each loudspeaker may include one or more speakers. In another aspect, the electronic device is a first electronic device, where the instructions to drive the speakers includes instructions to transmit the output audio signals to a second electronic device that includes or is communicatively coupled to the speakers to cause the second electronic device to playback the output audio signals.

In one aspect, the instructions to produce the output audio signals includes instructions to: render the first group of audio signals to produce a group of speaker driver signals; and apply at least one of the adaptive filters to at least one of the speaker driver signals. In another aspect, the memory has further instructions to perform a sound field analysis upon the second group of audio signals to determine one or more parameters associated with the sound field, where the adaptive filters are determined based on the least some of the second group of audio signals and the one or more parameters. In some aspects, the one or more parameters include at least one of a direction of arrival (DOA) associated with a sound source of the sound field, diffuseness of the sound field, reverberance of the sound field, and direct-to-ambience ratio of sound of the sound field.

In one aspect, the output audio signals is a first group of output audio signals, where the memory has further instructions to: determine a computational load on the electronic device; in response to determining that the adaptive filters are no longer to be determined based on the computational load, render the second group of audio signals to produce a second group of output audio signals; and drive the speakers using the second group of output audio signals in lieu of (or instead of) the first group of output audio signals.

In another aspect, the memory may include instructions stored therein which when executed by the processor causes the electronic device to perform at least some of the operations described herein.

According to another aspect of the disclosure is a processor of an electronic device configured to extract a FOA signal from a HOA signal; perform non-parametric spatial audio rendering upon the HOA signal to produce spatially rendered audio signals; perform parametric spatial audio processing upon the FOA signal to produce one or more adaptive filters; and produce output audio signals by applying the one or more adaptive filters upon the spatially rendered audio signals.

In one aspect, performing the parametric spatial audio processing includes performing a sound field analysis upon the FOA signal to determine one or more parameters associated with a sound field of the FOA signal, where the one or more parameters includes at least one of a DOA associated with a sound source of the sound field, diffuseness of the sound field, reverberance of the sound field, and direct-to-ambience ratio of sound of the sound field, and the one or more adaptive filters are determined based on the FOA signal and the one or more parameters. In another aspect, the processor is configured to cause speakers to playback the output audio signals; determine a computational load on the electronic device; in response to determining that the computational load is greater than a threshold, cease performing the parametric spatial audio processing; and cause the speakers to playback the plurality of spatially rendered audio signals in lieu of the output audio signals. In another aspect, the processor may be configured to perform at least some of the operations described herein.

The above summary does not include an exhaustive list of all aspects of the disclosure. It is contemplated that the disclosure includes all systems and methods that can be practiced from all suitable combinations of the various aspects summarized above, as well as those disclosed in the Detailed Description below and particularly pointed out in the claims. Such combinations may have particular advantages not specifically recited in the above summary.

BRIEF DESCRIPTION OF THE DRA WINGS

The aspects are illustrated by way of example and not by way of limitation in the figures of the accompanying drawings in which like references indicate similar elements. It should be noted that references to "an" or "one" aspect of this disclosure are not necessarily to the same aspect, and they mean at least one. Also, in the interest of conciseness and reducing the total number of figures, a given figure may be used to illustrate the features of more than one aspect, and not all elements in the figure may be required for a given aspect.

DETAILED DESCRIPTION

Figure 1:
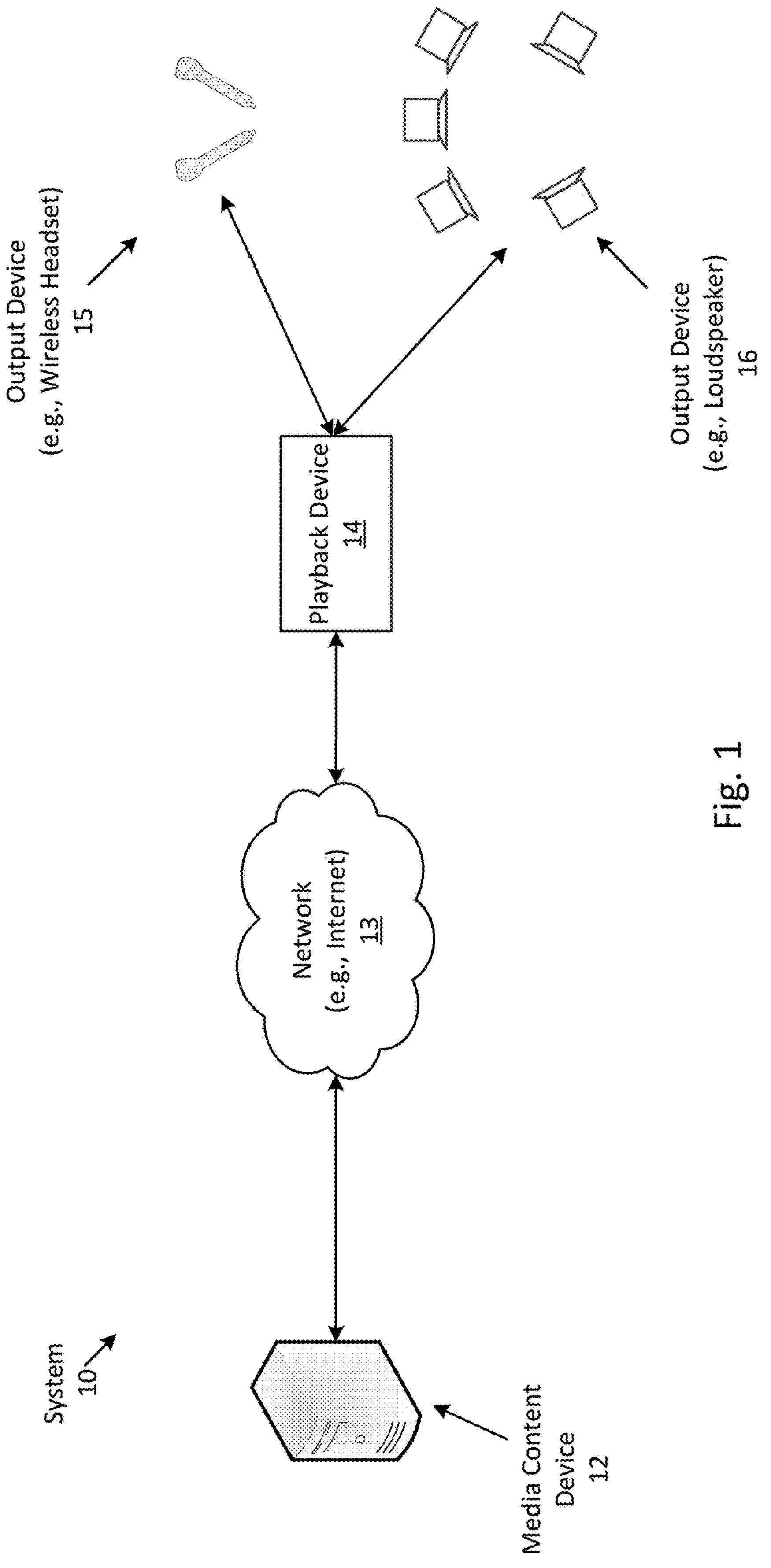
FIG. 1 shows a system that performs spatial audio processing using ambisonics.

Several aspects of the disclosure with reference to the appended drawings are now explained. Whenever the shapes, relative positions and other aspects of the parts described in a given aspect are not explicitly defined, the scope of the disclosure here is not limited only to the parts shown, which are meant merely for the purpose of illustration. Also, while numerous details are set forth, it is understood that some aspects may be practiced without these details. In other instances, well-known circuits, structures, and techniques have not been shown in detail so as not to obscure the understanding of this description. Furthermore, unless the meaning is clearly to the contrary, all ranges set forth herein are deemed to be inclusive of each range's endpoints.

An audio program may be recorded and stored in a spherical audio format, such as an ambisonics audio format. In which case, a sound field may be recorded as an ambisonics representation (ambisonics data) and stored as an audio file. In particular, audio content may be recorded (e.g., using a special microphone array with microphones arranged in a particular arrangement, such as a spherical microphone array), and stored as several channels, such as ambisonics B-format or higher order. Ambisonics audio format has flexibility when compared to other types of audio formats that specify specific playback configurations, such as stereo, 5.1 surround sound, etc., because ambisonics audio recordings can be rendered to different playback configurations. In other words, ambisonics audio recording files do not specify or require a particular playback arrangement.

A higher-order ambisonics (HOA) signal may be characterized by a high number of channels. In particular, a three-dimensional (3D) sound field representation of (a piece of) audio content may include (e.g., be represented by) a number of (ambisonics) channels defined by $(M+1)^2$, where M is the order. For example, a $1^{st}$ order ambisonics recording may include four channels, a $2^{nd}$ order ambisonics recording may include nine channels, while a $3^{rd}$ order ambisonics recording may include 16 channels. Different orders of ambisonics may include different spatial resolutions during playback. In particular, the spatial resolution of am ambisonics recording may depend on its order. For example, the $1^{st}$ order ambisonics recording may have a low spatial resolution, resulting in blurry sound sources during rendering and playback by an audio rendering system. As the order of ambisonics increases, however, spatial resolution may improve, but as a result, the number of channels also increases, thereby causing the ambisonics audio file to grow to a large file size. The increasing file size may make the rendering of the ambisonics audio computationally unwieldly for consumer electronics that have limited computational power.

There may be two methods for capturing and rendering a sound field using ambisonics as an input format. A first is a non-parametric (or linear) spatial audio rendering process. In this approach, ambisonics signals may be mixed linearly to produce a desired output format, such as a stereo format (e.g., for headphones) or a surround sound format, such as 5.1 surround sound format. For example, the $1^{st}$ order ambisonics includes four signals: a signal W corresponding to an omnidirectional beam pattern, and three signals, X, Y, and Z, which correspond to different figure-of-eight patterns. To linearly produce a stereo reproduction, which includes a left channel and a right channel, the $1^{st}$ order ambisonics may be spatially rendered by combining at least some of the ambisonics signals. For instance, the left channel may be a linear combination of the W signal and Y signal, while the right channel may be a difference between the W signal and the Y signal. As a result, a non-parametric spatial audio reproduction of an ambisonics signal may require a small amount of computational power, but may not provide sufficient spatial resolution during playback.

A second method is a parametric spatial audio (rendering) process, which may provide a higher resolution capture and rendering performance than the linear approach. In this approach, a sound field may be captured with as a set of ambisonics signals and analyzed (through a parametric spatial audio analysis) to estimate a set of parameters that describe the captured sound field. In particular, a "parameter" may be any spatial characteristic that may help to define or classify one or more properties of a sound field. Examples of parameters may include a direction of arrival (DoA) that may be associated with a sound source of a sound field, or a diffuseness of the sound field. The parameters, along with at least some of the original ambisonics signals may be used by a spatial audio renderer to synthesize the captured sound field and render it for any type of speaker layout, such as headphones or loudspeakers. Unlike non-parametric spatial audio rendering, parametric rendering requires a significant amount of computational power. In particular, as the order of ambisonics increases, so does the computational load. Therefore, parametric rendering may put a heavy computational load upon a computing device, especially for higher-order ambisonics.

Unfortunately, computational power may be limited in some consumer electronics, such as mobile devices with limited power storage. For higher-order ambisonics, this computational overhead may be a limiting factor for using parametric spatial rendering of ambisonics and for that reason parametric spatial audio rendering may not be performed or may be significantly limited. Therefore, there is a need for a method and system of spatial audio processing using parametric and non-parametric spatial audio rendering of multiple orders of ambisonics to enhance spatial resolution while minimizing computational power requirements.

To solve this problem, the present disclosure provides spatial audio processing using multiple orders of ambisonics in which a HOA signal of audio content and a FOA signal of audio content are used for spatially render the audio. For example, a FOA representation of the sound field is separated from its HOA representation. Through a parametric analysis of the FOA representation, which requires a less computational burden than if performed upon a HOA representation, the system determines adaptive sharpening filters. In one aspect, these filters may be determined from parameters that are estimated from the parametric analysis. The filters may be applied to a spatial rendering of the HOA representation to produce output audio signals that may be used to drive speakers of a particular speaker layout. The resulting pipeline may provide a higher resolution rendering than if only non-parametric spatial audio rendering processes were performed, while requiring less computational power than parametric spatial audio rendering for higher-order ambisonics (e.g., $2^{nd}$ order and above).

FIG. 1 shows an audio system (or "system") 10 that performs spatial audio processing using multiple orders of ambisonics. As described herein, this may provide users with higher spatial resolution during audio playback. The audio system includes a playback (or companion) device 14, a network 13 (e.g., a computer network, such as the Internet), a media content device (or server) 12, and output device 15 or output device 16. In one aspect, the system may include more or less elements. For example, the audio system may include other output devices, or may only include one output device, such as device 15. As another example, the system may not include the media content device 12. As described herein, the device 12 may provide audio content to other devices, such as the playback device 15. In another aspect, the playback device may retrieve audio content from local memory instead of retrieving the audio content from the media content device 12.

In some aspects, the media content device 12 may be a stand-alone server computer or a cluster of server computers configured to stream media content to electronic devices, such as the playback device and/or one or more output devices. In which case, the server may be a part of a cloud computing system that is capable of streaming data as a cloud-based service that is provided to one or more subscribers (e.g., of the local and/or remote device(s)). In some aspects, the server may be configured to stream any type of media (or multi-media) content, such as audio content that may include musical compositions, audiobooks, podcasts, etc., still images, video content that may include movies, television productions, etc. In one aspect, the server may use any audio and/or video encoding format and/or any method for streaming the content to one or more devices.

As referenced herein, "audio content" may be (and include) any type of (e.g., user-desired) audio, such as a musical composition, a podcast, audio of an extended reality (XR) environment (e.g., virtual reality (VR), augmented reality (AR), and/or mixed reality (MR) environment), a soundtrack of a motion picture, etc. In another aspect, audio content may include sounds of one or more software applications (e.g., sounds of a virtual personal assistant (VPA) application), system sounds, or any type of sound for playback by an electronic device through one or more speakers. In another aspect, the audio content may include sounds of a call, such as a telephone call or a video conference (VOIP) call, which may be conducted by a telephony application with another electronic device. In which case, the audio content may include a downlink signal from the other electronic device. In one aspect, the audio content may be a part of a piece of audio content, which may be an audio program or audio file that includes one or more audio signals that includes at least a portion of the audio content. In some aspects, the audio program may be any type of audio content format. In one aspect, an audio program may include audio content for spatial rendering as one or more data files in one or various 3D audio formats, such as having one or more audio channels. For instance, an audio program may include a mono audio channel or may be a multi-audio channel format (e.g., two stereo channels, six surround source channels (in 5.1 surround format), etc.). In another aspect, the audio program may include one or more audio objects, each having at least one audio signal, and positional data (for spatially rendering the object's audio signals) in 3D sound. In another aspect, the audio program may be represented in a spherical audio format, such as HOA audio format.

In some aspects, the playback device 14 may be any type of electronic device that may perform spatial audio processing operations and audio playback operations. For instance, the playback device may be a desktop computer, a laptop computer, a digital media player, etc. In one aspect, the playback device may be a portable electronic device (e.g., being handheld operable), such as a tablet computer, a smart phone, etc. In another aspect, the playback device may be a head-mounted device, such as smart glasses, or a wearable device, such as a smart watch.

As shown, the playback device 14 may be configured to communicatively couple with the media content device 12, via the network 13, such that both devices may be configured to communicate with one another using any communication protocol. In another aspect, any of the output devices may communicatively couple with the playback device 14 via the network 13. In one aspect, the network 13 may be any type of computer network, such as a wide area network (WAN) (e.g., the Internet), a local area network (LAN), etc., through which the devices may exchange data between one another and/or may exchange data with one or more other electronic devices, such as a remote electronic server. In another aspect, the network may be a wireless network such as a wireless local area network (WLAN), a cellular network, etc., in order to exchange digital (e.g., audio) data. With respect to the cellular network, the playback device 14 may be configured to establish a wireless (e.g., cellular) call, in which the cellular network may include one or more cell towers, which may be part of a communication network (e.g., a 4G Long Term Evolution (LTE) network) that supports data transmission (and/or voice calls) for electronic devices, such as mobile devices (e.g., smartphones).

In another aspect, the devices may be configured to wirelessly exchange data via other networks, such as a Wireless Personal Area Network (WPAN) connection. For instance, the output device 15 may be configured to establish a wireless connection with the playback device 14 via a wireless communication protocol (e.g., BLUETOOTH protocol or any other wireless communication protocol). During the established wireless connection, the devices may exchange (e.g., transmit and receive) data packets (e.g., Internet Protocol (IP) packets) with the digital (e.g., audio) data, which may include a representation of audio content that is being played back by the playback device 15.

As illustrated, the system 10 may include one or more output devices 15 and 16, each of which may be any electronic device that includes or may be communicatively coupled to at least one speaker and may be configured to output sound by driving the speaker. For instance, as illustrated, the output device 15 is a wireless headset (e.g., in-ear headphones or earbuds) that are designed to be positioned on (or in) a user's ears, and are designed to output sound into the user's ear canal. In some aspects, the earphone may be a sealing type that has a flexible ear tip that serves to acoustically seal off the entrance of the user's ear canal from an ambient environment by blocking or occluding in the ear canal. In this case, the headset may include two earphones, a left earphone for the user's left ear and a right earphone for the user's right ear. In this case, each earphone may be configured to output at least one audio channel of media content (e.g., the right earphone outputting a right audio channel and the left earphone outputting a left audio channel of a two-channel input of a stereophonic recording, such as a musical work). In another aspect, the output device may be any electronic device that includes at least one speaker and is arranged to be worn by the user and arranged to output sound by driving the speaker with an audio signal. As another example, the output device may be any type of headset, such as an over-the-ear (or on-the-ear) headset that at least partially covers the user's ears and is arranged to direct sound into the ears of the user.

In one aspect, the output device 15 may be any type of device that may be worn by a user and produce sound directed into the user's ears, such as a headset. In another aspect, the output device may be any type of electronic device that may be worn by a user, such as smart glasses. In one aspect, the device may include one or more "extra-aural" speakers, which may be arranged to output sound into the ambient environment rather than (directly) into the user's ears. In which case, the output device may be configured to use the extra-aural speakers to produce one or more beam patterns, each of which may include at least a portion of audio content in order to produce spatially selective sound output. Such beam patterns may be directed to locations within the environment, such as a location of the user's ears.

As illustrated, the output device 16 includes one or more loudspeakers. In particular, the output device 16 includes five loudspeakers that are arranged in a 5.1 surround sound loudspeaker arrangement. In one aspect, the output device 16 may be any electronic device that includes at least one loudspeaker that is arranged to output (or project) sound into an ambient environment. Examples may include a stand-alone speaker, a smart speaker, a home theater system, or an infotainment system that is integrated within a vehicle.

In one aspect, the playback device 14 may be arranged to perform at least some of the spatial audio processing operations using multiple orders of ambisonics described herein. In particular, the playback device may be configured to spatially render audio content to produce one or more output audio signals (or speaker drivers), with which the playback device may use to drive one or more speakers of either (or both) of the output devices 15 and 16. For instance, upon producing the output audio signals, the playback device 14 may transmit the signals to the output device 15 for playback. In another aspect, the output devices may perform at least some of the operations described herein. In which case, the playback device may be an optional device, whereby an output device, such as device 15, may receive audio content, spatial render the audio content by performing at least some of the operations described herein, and playback the spatially rendered audio content through one or more speakers.

In some aspects, the playback device 14 and the audio output device 15 (or device 16) may be distinct (separate) electronic devices, as shown herein. In another aspect, the playback device may be a part of (or integrated with) an output device. For example, as described herein, at least some of the components of the playback device (such as a controller, memory, etc.) may be part of the output device 14, and/or at least some of the components of the output device, such as one or more speakers may be part of the playback device. In this case, each of the devices may be communicatively coupled via traces that are a part of one or more printed circuit boards (PCBs) within the devices.

Figure 2:
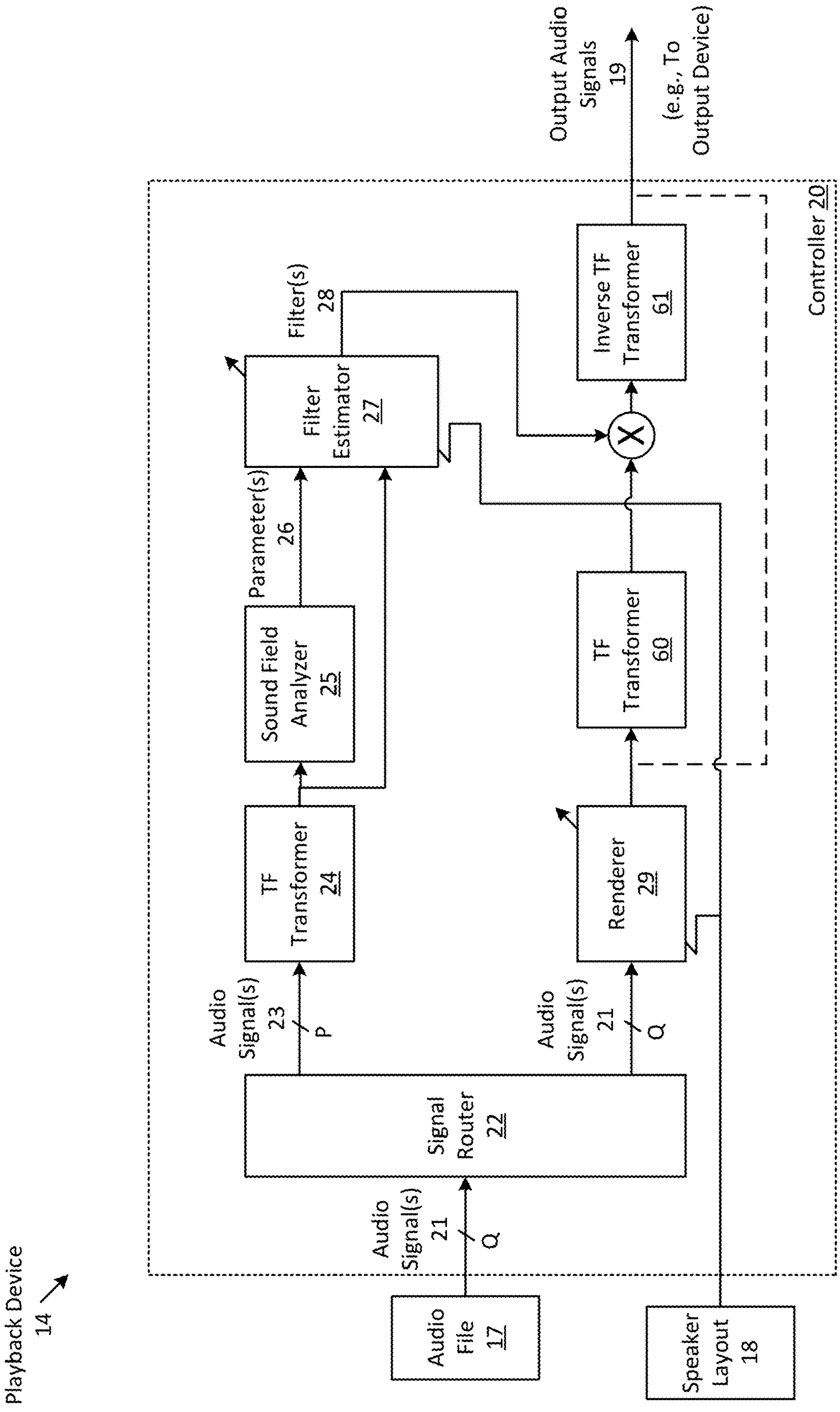
FIG. 2 is a block diagram of a playback device of the system that performs spatial audio processing using a higher-order ambisonics (HOA) and the first-order ambisonics (FOA) of the HOA according to one aspect.

FIG. 2 is a block diagram of the playback device 14 that performs spatial audio processing using multiple orders of ambisonics, such as using HOA data and the first-order ambisonics (FOA) data of the HOA data according to one aspect. The playback device 14 includes an audio file 17, speaker layout 18, and a controller 20. In one aspect, the audio file 17 and the speaker layout 18 may be a part of or stored within memory of (e.g., the controller 20 of the) playback device 14. In one aspect, the elements may be a part of one or more other devices, such as the audio file being a part of (e.g., stored in memory of) the media content device 12. In which case, the playback device may stream the audio file 17, via the network 13, from the media device 12. In another aspect, the controller 20 may be a part of another device, such as the output device 15. In which case, the operations described herein may be performed by an output device, and therefore the playback device 14 may be an optional device of the system 10.

The controller 20 may be a special-purpose processor such as an application-specific integrated circuit (ASIC), a general-purpose microprocessor, a field-programmable gate array (FPGA), a digital signal controller, or a set of hardware logic structures (e.g., filters, arithmetic logic units, and dedicated state machines). The controller 20 may be configured to perform audio signal processing operations, such as spatial audio processing operations and/or networking operations. More about the operations performed by the controller 20 is described herein.

In one aspect, the audio file 17 may include any type of audio content, such as a musical composition. The audio file may include an ambisonics audio recording as one or more channels that may be formatted in B-format or higher in one of numerous higher-order ambisonics formatting conventions, for example ACN, SID, Furse-Malham or others and different normalization schemes such as N3D, SN3d, N2D, SN2D, maxN or others, which can result in additional loss. The audio file may include a HOA representation of a sound field that includes several audio signals (or channels). In some aspects, the audio file 17 may be produced (e.g., in a recording studio) to include audio content as an ambisonics recording. In another aspect, the audio file may be a recording of one or more microphones (not shown) of the system 10. In which case, microphones that may be a part of one or more devices of the system 10 may capture sound of the ambient environment, which may be stored in an ambisonics format.

The speaker layout 18 may include an indication of arrangement of speakers of one or more output devices. For example, with respect to the output device 16 that includes five loudspeakers, the speaker layout 18 may indicate the number of loudspeakers and/or the placement of the loudspeakers with respect to each other (and/or with respect to a reference point within the environment, such as a listening position). With respect to the output device 15, the speaker layout 18 may indicate that the speakers are of a headset. The controller 20 may be configured to determine the speaker layout 18 of an output device that is to (or is) playing back the audio content. As described herein, the speaker layout 18 may be stored in memory of the playback device. In which case, the speaker layout may be provided by an output device through which audio content is being (or to be) played back. For example, the output device 16 may provide the speaker layout to the playback device 14, via a wireless data connection. In another aspect, the speaker layout 18 may be determined through the use of one or more sensors of the system 10, such as a camera. In which case, the camera may capture an image of an output device 16 and may determine the layout of the loudspeaker(s) of the device based on image recognition.

The controller 20 has several operational blocks for performing audio spatial processing using multiple orders of ambisonics. As shown, the controller includes a signal router 22, time-frequency (TF) transformers 24 and 60, a sound field analyzer 25, a filter estimator 27, a (e.g., audio) renderer 29, and an inverse TF transformer 61. In one aspect, the controller may have more or less operational blocks. For example, the controller may include one or more scalar gains, each of which may be configured to apply one or more gains to one or more audio signals. A description of the operational blocks is as follows.

The controller 20 may be configured to receive the audio file 17, which includes "Q" audio signals 21 of audio content. As described herein, the audio content may be in a spherical audio format, such as a HOA audio format that includes a HOA representation of a sound field as several audio signals 21. In one aspect, the controller may receive the audio file based on user input. For example, a user may request (e.g., via one or more user input devices, such as a touchscreen) a media software application being executed by the controller 20 to stream audio content (e.g., from the media content device 12). In which case, the controller 20 may receive the audio content as a HOA representation via the network 13. The signal router 22 receives the audio signals 21, and separates (extracts or splits) audio signals associated with the FOA data from the received HOA data. In which case, the router 22 may extract a FOA signal that may include one or more ambisonics channels from a HOA signal, which may include more ambisonics channels than the FOA signal. As described herein, a higher-order ambisonics signal may include signals associated with each lower order. For example, a $2^{nd}$ order ambisonics includes five channels of the $2^{nd}$ order, three channels of the $1^{st}$ order, and one channel of the $0^{th}$ order. As a result, the signal router 22 may separate the four ("P") audio signals 23 associated with the FOA representation (e.g., signals W, X, Y, and Z) of the audio file from the audio signals 21.

The TF transformer 24 may be configured to receive the audio signals 23, which may be time domain signals, and transforms the signals into the time-frequency domain. The transformer may receive audio signals 23, and may produce the time-frequency signals based on the time-domain signals. For example, the time-frequency signals may include frequency components of the audio signals with respect to (or as a function of) time. The sound field analyzer 25 may be configured to receive the time-frequency signals from the TF transformer 24 and may perform a sound field analysis upon the signals to determine (produce) one or more (spatial) parameters 26 associated with (e.g., one or more sound sources of) the sound field of (e.g., the FOA data of the) audio content. The analyzer may determine parameters of at least some time-frequency signals of the sound field that quantify one or more properties of the sound field depending on frequency and time. For example, the analyzer 25 may determine a DoA associated with one or more sound sources of the sound field based on an acoustic analysis of at least some of the time-frequency signals, such as being based on cross-correlation between two or more signals and/or acoustic intensity. The analyzer 25 may determine other parameters that may indicate spatial characteristics of one or more sounds of the sound field, such as inter-channel level differences (ICLD), inter-channel time differences (ICTD), and/or inter-channel coherences (ICC). As another example, the analyzer 25 may determine a direct-to-ambience ratio of sound of the sound field by identifying one or more directional components, which may be identified based on a strong correlation between two or more signals, whereas the ambience may be determined based on sound that is fully or partially uncorrelated with the directional component. Other parameters may include diffuseness of the sound field and reverberance of the sound field. In one aspect, the analyzer 25 may use any method to determine any type of parameter that may provide one or more quantitative properties of the sound field of the audio signals 23 in the time-frequency domain. For instance, the analyzer may estimate DoA of one or more sound sources using multiple signal classification analysis. The analyzer may use (e.g., non-linear) machine learning based methods for parameter estimation.

The filter estimator 27 receives the parameters 26 produced by the analyzer 25 and one or more of the audio signals 23 in the time-frequency domain, and estimates (or determines) one or more adaptive filters 28 based on the parameters 26 and/or at least some of the audio signals 23. The filters 28 may include sharpening filters that may provide spatial enhancement of a spatial rendering of the audio content. For example, when applied to one or more audio signals, the sharpening filters may enhance direction components of one or more signals. In which case, the filters may enhance sound (as perceived by a listener) of one or more sound sources within the sound field. In one aspect, the filters 28 may be non-linear and/or linear filters. The sharpening filters may be any type of audio filter, such as high-pass filters, low-pass filters, band-pass filters, etc. In another aspect, the filters may be signal-dependent. In particular, the adaptive filters may include time-frequency adaptive weights, which may be adaptive based on changes to the audio signal(s) 23. In one aspect, the filters produced by the filter estimator 27 may be based on the speaker layout 18 of the output device that is playing (or is to) back the audio content of the audio file 17. For example, the filter estimator 27 may produce one or more filters 28 for each output audio signal that may be used to drive a speaker of an output device. In which case, the filter estimator 27 may adjust the number and/or type of filters produced based on changes to the speaker layout 18 (or changes to the output device, such as switching between a smart speaker to a headset). In another aspect, the adaptive filters may be produced through any method using at least one of the audio signals 23 and/or at least one parameter 26, based on the speaker layout 18.

The renderer 29 receives the audio signals 21, and produces one or more rendered (or driver) signals by spatially rendering at least some of the audio signals 21 based on (according to) the speaker layout 18. In particular, the renderer 29 may perform non-parametric spatial audio rendering upon one or more of the audio signals 21 to produce one or more driver signals. For example, in the case of a headset (e.g., output device 15), the renderer 29 may produce two driver signals. In one aspect, the renderer 29 may apply one or more spatial filters, such as head-related transfer functions (HRTFs) upon the spatially rendered signals. Continuing with the previous example, when the speaker layout 18 indicates a headset, the renderer may perform linear spatial rendering upon the ambisonics audio signals 21 to produce two rendered signals (a left signal and a right signal, and may apply the HRTFs to produce one or more binaural audio signals as the one or more output audio signals 19.

The TF transformer 60 receives the rendered signals from the renderer 29 and transforms the time-domain signals into time-frequency signals. The controller 20 produces one or more output audio signals 19 by applying (e.g., multiplying) the filters 28 to one or more rendered signals in the time-frequency domain. In one aspect, the controller may apply one or more filters upon one or more rendered signals in order to improve (enhance) the spatial resolution of the audio content. The inverse TF transformer 61 transforms the output audio signals 19 into the time-domain. The controller 20 may be configured to drive one or more speakers of an output device, such as output device 15, using the output audio signals. In particular, the controller 20 may transmit the output audio signals 19 to the output device (e.g., device 15 and/or 16) in order for the output device to spatially reproduce the sound field of the audio file 17.

As described herein, the operations performed by the controller may be used to sharpen spatial resolution of a linear, non-parametric audio rendering of the ambisonics recording of the audio content of the audio file 17 performed by the renderer 29 with filters that are estimated using parametric spatial audio processing of at least a portion of the audio file. In particular, the audio file, which may be of any ambisonics order (e.g., $2^{nd}$ order) may be received and divided into two pipelines: a first pipeline that includes audio signals 23 of a FOA signal of the received ambisonics recording and a second pipeline that includes audio signals 21 of the received ambisonics (e.g., HOA) recording. In the first pipeline, which includes operational blocks 24, 25, and 27 (and 60 and 61), the controller 20 may perform parametric spatial audio processing upon the FOA to estimate one or more adaptive filters 28 (and to apply the filters). The second pipeline may include renderer 29 in which the controller may perform non-parametric spatial audio rendering upon of the original HOA signal to produce several spatially rendered audio signals by combining one or more of the audio signals 21 according to the speaker layout 18. The controller may produce the output audio signals 19 by applying e.g., in the time-frequency domain) the adaptive filters 28 to the spatially rendered audio signals.

In one aspect, the controller 20 may perform the operations of the first pipeline and the second pipeline in parallel. In which case, the controller may determine the filters 28 and spatially render the audio content non-parametrically substantially simultaneously. In some aspects, the operations described herein may be performed in real-time, as the system 10 plays back audio content through one or more output devices. In particular, the controller 20 may perform the spatial audio processing operations in "real-time", meaning as audio content is being processed as it is being received and/or rendered by the controller.

In some cases, the controller 20 may deactivate the parametric processing of the first pipeline. As described herein, parametric processing may put a high computational load upon the controller 20. In which case, when the controller may be unable to sustain the computational load of the parametric processing, the controller may deactivate the first pipeline and may continue to spatially render the audio content of the audio file 17 non-parametrically. In which case, the renderer 29 may produce the spatially rendered audio signals as the output audio signals 19, bypassing the operational blocks 60 and 61, and using the rendered signals for audio playback. More about deactivating the parametric processing is described herein.

Figure 3:
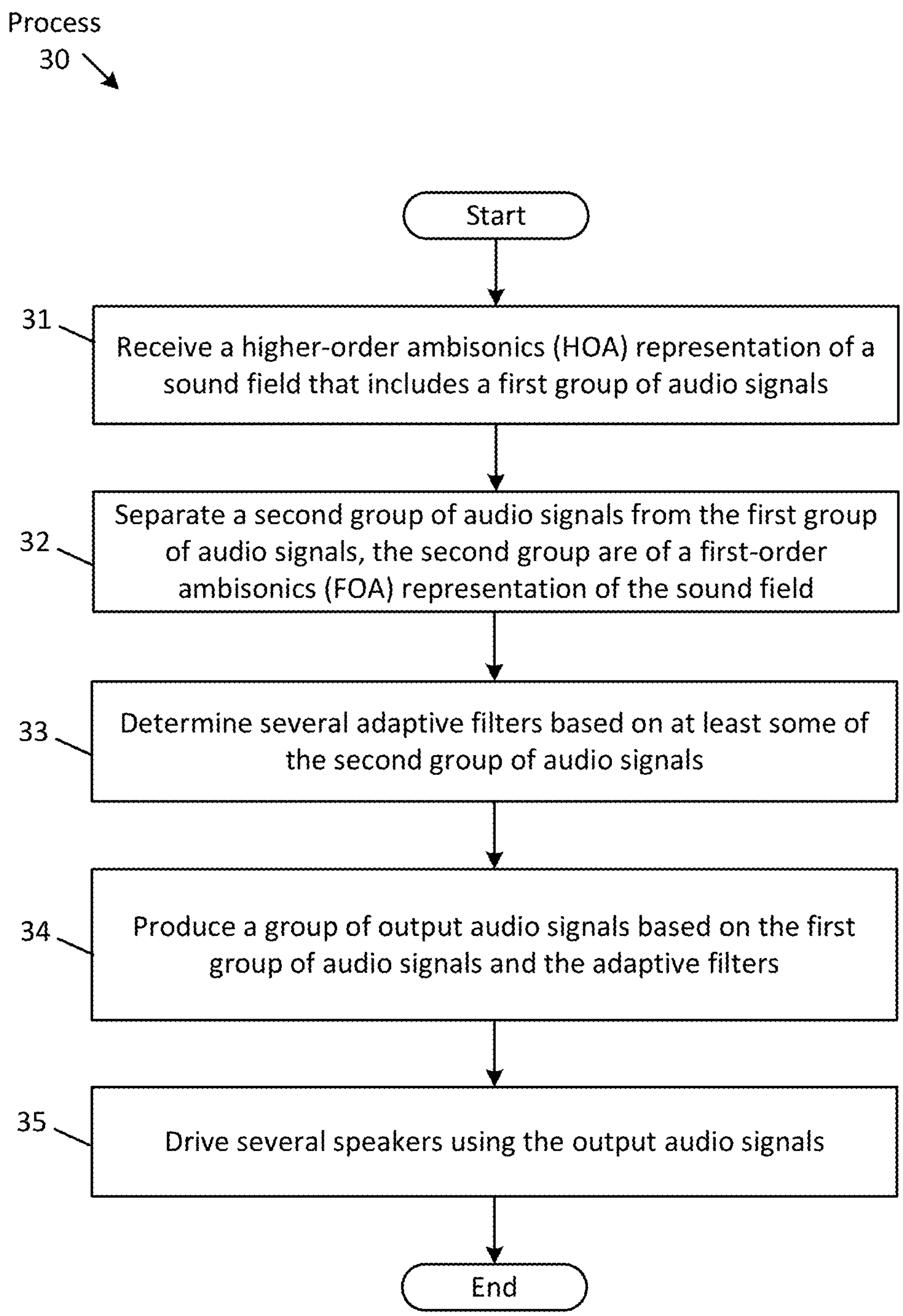
FIG. 3 is a flowchart of one aspect of a process performed by the system to perform spatial audio processing using multiple orders of ambisonics according to one aspect.
Figure 4:
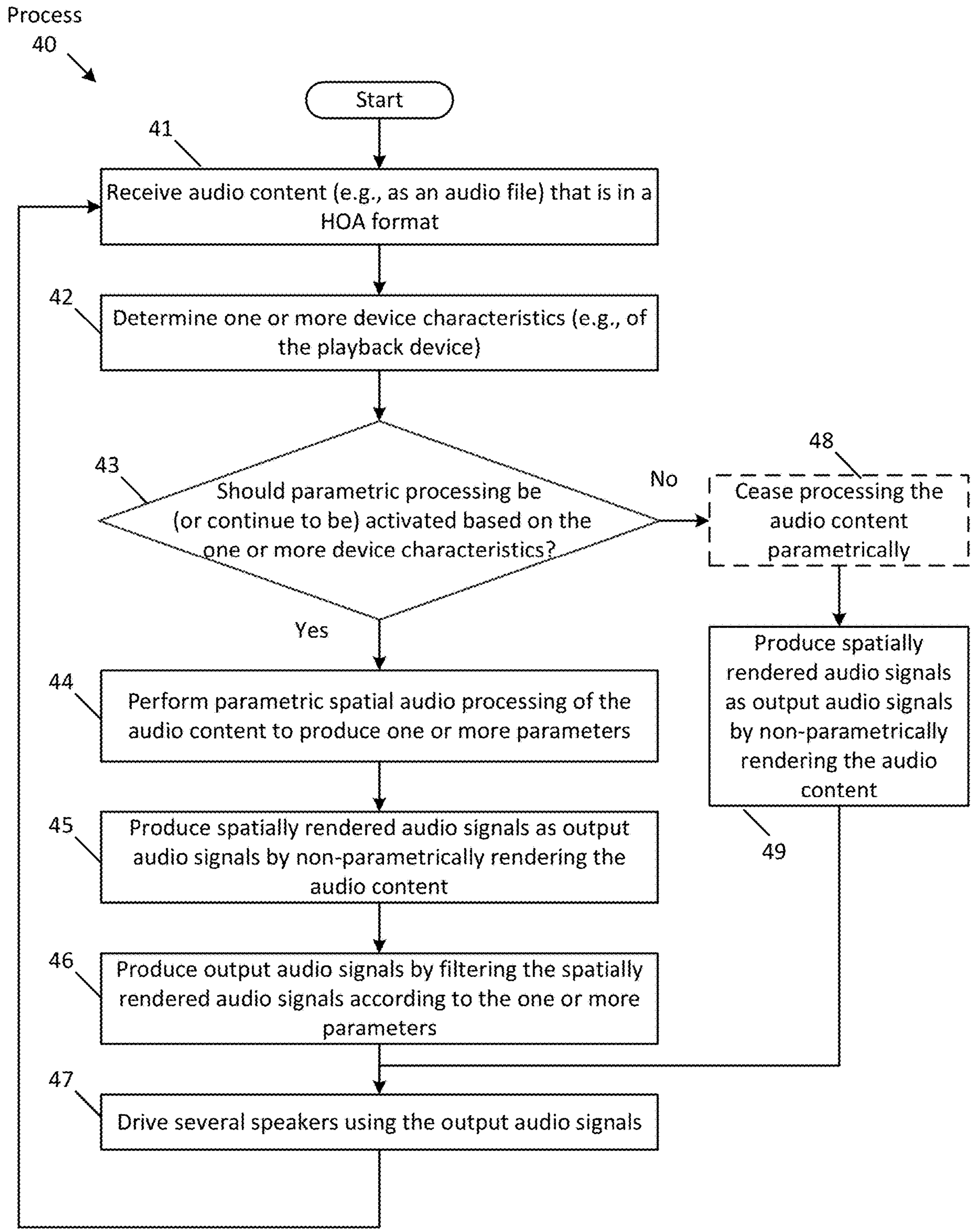
FIG. 4 is a flowchart of another aspect of a process performed by the system to perform spatial audio processing using ambisonics according to another aspect.

FIGS. 3 and 4 are flowcharts of processes 30 and 40, respectively for performing one or more audio signal processing operations for spatial audio processing of multiple orders of ambisonics for audio playback. In one aspect, the processes may be performed by one or more devices of the system 10, as illustrated in FIG. 1. For instance, at least some of the operations of one or more of these processes may be performed by (e.g., the controller 20 of) the playback device 14. As a result, at least some of the operations described herein may be with reference to FIGS. 1 and 2. In another aspect, at least some of the operations may be performed by another device, such as the output device 15 and/or a remote server communicatively coupled to the playback device 14 and/or the output device 15.

Turning to FIG. 3, this figure is a flowchart of one aspect of a process 30 performed by the system to perform spatial audio processing using ambisonics according to one aspect. The process 30 begins with the controller 20 receiving a HOA representation of a sound field that includes a first group of audio signals (at block 31). For instance, the signal router 22 of the controller 20 may receive the audio file 17 that may be in an ambisonics format that includes one or more audio signals 21, such as having nine audio signals when the audio file includes $2^{nd}$ order HOA (user-desired) audio content. The HOA representation may be of user-desired audio content, such as a musical composition. The signal router 22 separates (or splits) a second group of audio signals from the first group of audio signals, the second group of audio signals are of a FOA representation of the sound field (at block 32). Continuing with the previous example, when the audio file includes a $2^{nd}$ order HOA, the controller may extract the four audio signals associated with the FOA of the $2^{nd}$ order HOA.

The controller 20 determines several adaptive filters based on at least some of the second group of audio signals (at block 33). The sound field analyzer controller 20 may perform parametric spatial audio processing upon the audio signals 23 of the FOA representation of the sound field to determine one or more parameters 26 associated with at least a portion of the sound field. Using the parameters and one or more of the four FOA audio signals, the filter estimator 27 of the controller 20 may produce one or more adaptive filters according to the speaker layout of an output device of the system 10 that is to play back (or is playing back) the audio content. For the output device 15, the speaker layout may indicate two speakers, left speaker and right speaker, and/or their relative arrangement, where the filter estimator 27 may produce one or more filters for at least one (e.g., driver signal of at least one) of the two speakers of the headset.

The controller 20 produces a group of output audio signals based on the first group of audio signals and the adaptive filters (at block 34). In particular, the controller 20 may produce the output audio signals 19 by applying the adaptive filters 28 to a linear rendering of the HOA audio signals 21 by the renderer 29 according to the speaker layout of the speakers of the output device (or of the playback device), where each of the output audio signals 19 may include at least a portion of the sound field. The controller 20 drives several speakers using the output audio signals (at block 35). For example, the controller 20 may cause the playback device 14 to transmit the output audio signals 19 to an output device that includes or may be communicatively coupled to the speakers to cause the output device to playback the signals (e.g., to be used to drive speakers of the output device). As another example, the speakers may be a part of the playback device. In which case, the controller 20 may drive one or more speakers of the playback device using one or more of the output audio signals 19.

In one aspect, the controller 20 may perform at least some of the operations of the process 30 while playing back the audio content. For instance, the controller 20 may playback, by an electronic device such as the playback device, the user-desired audio content through several speaker. To playback the audio content, the playback device may drive integrated speakers, or may transmit the audio content to an output device, such as output device 16. In which case, the operations of the process 30 (e.g., the receiving, separating, determining, producing, and driving of operational blocks 31-35) may be performed while the user-desired audio content is played back by the playback device.

FIG. 4 is a flowchart of another aspect of a process 40 for performing spatial audio processing using ambisonics according to another aspect. In one aspect, the controller 20 may perform at least some of the operations of the process 40 while performing spatial audio processing upon an ambisonics recording for playback through one or more speakers. The process 40 begins with the controller 20 receiving audio content (e.g., as an audio file, such as file 17) that is in a HOA format (at block 41). For instance, the audio file may include a $3^{rd}$ order ambisonics representation of a sound field, such as a virtual sound field of a XR environment in which a user of the system 10 may be participating. In another aspect, the audio content may include one or more microphone signals captured by one or more microphones (e.g., of the playback device 14), where the signals of the ambisonics recording of the audio file may include or be based on the microphone signals.

The controller 20 determines one or more device characteristics of the playback device 14, for example (at block 42). In particular, the controller may determine characteristics of one or more devices of the system 10 that may perform the spatial audio processing, as described herein. In this case, the controller 20 may determine device characteristics of the playback device 14. In one aspect, the device characteristics may be any properties that indicate a computational or processing load on the playback device. For example, a device characteristic may include a current power storage level of an energy storage device (e.g., a battery) of the playback device. As another example, the device characteristics may indicate available resources (e.g., processor availability, memory availability, etc.) of the (e.g., controller 20 of the) playback device. Determining available resources may indicate whether the playback device may be capable of performing parametric and non-parametric processing for the spatial audio processing of the audio file. In one aspect, the controller may determine a current computational or processing load based on the determined device characteristics.

The controller 20 determines whether parametric processing be (or continue to be) activated based on the one or more device characteristics (at decision block 43). In particular, the controller 20 may determine whether the audio content is to be processed parametrically to determine the one or more adaptive filters, which may be applied to the non-parametric rendering of the audio content. Thus, the controller determines whether filters are to (continue to) be determined through parametric processing. As described herein, parametric processing of audio content may require processing resources, and therefore depending on the computational or processing load of the (e.g., controller 20 of the) playback device, the production and application of the adaptive filters may be turned on or off. In one aspect, the controller may determine the computational load based on the processes (or jobs) of one or more (other) operations that are being executed by (one or more processors of) an electronic device, such as the playback device. In another aspect, the computational load on (one or more processors of) the electronic device may be based on one or more device characteristics, such as (hardware) resource usage or resource availability, such as memory usage or availability, etc. In one aspect, the controller may determine the computational load as a value (or percentage) of an overall computational capability of the playback device. Since the parametric processing spatially enhances the non-parametric rendering of the audio content, the spatial enhancement may be deactivated when the computational or processing load is above (greater than) a threshold. As another example, the controller may determine whether to perform the parametric processing based on whether the current power storage level is above a threshold.

In one aspect, the controller may determine that the adaptive filters are no longer to be determined. In particular, in response to determining that the parametric processing should be deactivated (e.g., based on the current power storage level being below a threshold, the computational or processing load being greater than a threshold, etc.), the controller 20 may cease processing the audio content parametrically (at block 48). Specifically, the controller 20 may cease producing the one or more parameters 26 and/or the one or more filters 28 if these elements are already being produced to spatially enhance the audio content, such as during playback of the audio content. In one aspect, this operational block may be optional in the case in which the process 40 is performed before the system 10 begins spatial audio processing of the audio file for playback. The controller 20 produces spatially rendered audio signals as output audio signals by non-parametrically (linearly) rendering the audio content (at block 49). In particular, the renderer 29 may spatially render the audio signals 21 according to the speaker layout 18 to produce the output audio signals 19. In which case, the controller 20 may not perform at least some operations, such as those described in blocks 24, 25, 27, 60, and 61 of FIG. 2. The controller 20 drives several speakers using the output audio signals (at block 47). For instance, the controller 20 may drive speakers coupled to (or that are a part of) the playback device 14 using the output audio signals produced non-parametrically in lieu of output audio signals that are produced using spatial audio parametric processing. As another example, the controller may cause the playback device 14 to (e.g., wirelessly) transmit the output audio signals to an output device, such as output device 14, which may be configured to use the signals to drive one or more speakers.

The process 40 returns to block 41 to receive (or continue to receive) audio content. In which case, the controller 20 may perform the process 40 while audio content is processed and played back by an output device, such that the controller may determine whether to activate (or keep active) the non-parametric processing based on the computational or processing load, as described herein. This may provide a user of the system with a more enhanced acoustic experience, while ensuring that the system does not exceed computational limits. In addition, this may also allow the system to reactivate the parametric processing in cases in which the controller 20 may again begin such processing (e.g., when the overall computational load is decreased due to a reduction of other computational processes).

Returning to decision block 43, if parametric processing should be activated, which may be based on the playback device having available computational power (e.g., a processing load below a threshold), the controller 20 may perform parametric spatial audio processing of the audio content to produce one or more parameters (at block 44). In addition to producing the parameters 26, the controller 20 may produce one or more adaptive filters 28, as described herein. The controller 20 produces spatially rendered audio signals by non-parametrically rendering the audio content (at block 45). In one aspect, the controller may perform additional audio processing operations, such as applying one or more spatial filters (e.g., HRTFs) upon the audio content. The controller 20 produces output audio signals by filtering the spatially rendered audio signals according to the one or more parameters (at block 46). Specifically, the controller 20 may produce one or more adaptive filters based on the parameters, and may apply the filters to one or more spatially rendered audio signals. The controller drives several speakers using the output audio signals (at block 47).

As described herein, the controller 20 may perform the process 40 while receiving and rendering audio content for playback. In one aspect, the controller may activate and deactivate parametric processing one or more times during playback. In which case, the controller may cross-fade between non-parametric and parametric processing. For example, once the output audio signals 19 are transformed back into the time-domain by the inverse TF transformer 61, the audio data may be stored in one or more audio buffers for (wireless) transmission to the output device. Upon determining that parametric processing is to be deactivated, the controller may cease performing parametric processing, and may begin filling the audio buffers with non-parametric spatially rendered output audio signals form the renderer 29. As a result, once the playback device transmits the parametrically processed audio signals from the audio buffers, it will begin transmitting the non-parametrically processed spatially rendered audio signals.

Figure 5:
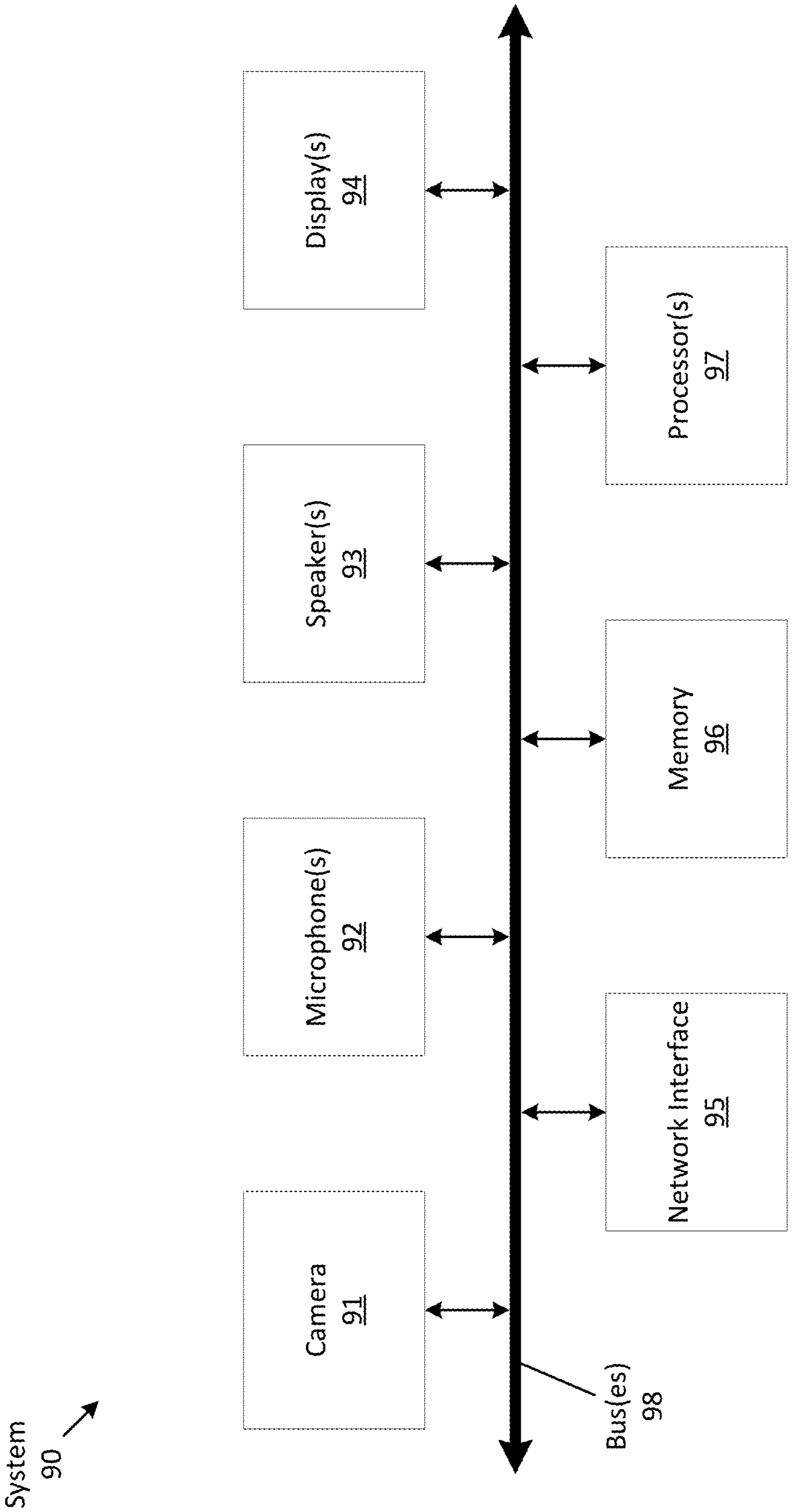
FIG. 5 illustrates an example of system hardware.

FIG. 5 shows a block diagram of hardware of an audio processing system 90, in one aspect, which may be used with or be a part of any of the aspects described herein (e.g., system 10, which may include the media content device 12, playback device 14, and/or output device 15 or 16). This audio processing system 90 can represent a general-purpose computer system or a special purpose computer system. Note that while FIG. 5 illustrates the various components of an audio processing system that may be incorporated into one or more of the devices described herein, it is merely one example of a particular implementation and is merely to illustrate the types of components that may be present in the audio processing system. FIG. 5 is not intended to represent any particular architecture or manner of interconnecting the components as such details are not germane to the aspects herein. It will also be appreciated that other types of audio processing systems that have fewer components than shown or more components than shown in FIG. 5 can also be used. Accordingly, the processes described herein are not limited to use with the hardware and software of FIG. 5.

As shown in FIG. 5, the audio processing system (or system) 90 (for example, a laptop computer, a desktop computer, a mobile phone, a smart phone, a tablet computer, a smart speaker, a head mounted display (HMD), a headphone set, or an infotainment system for an automobile or other vehicle) includes one or more buses 98 that serve to interconnect the various components of the system. One or more processors 97 are coupled to bus 98 as is known in the art. The processor(s) may be microprocessors or special purpose processors, system on chip (SOC), a central processing unit, a graphics processing unit, a processor created through an Application Specific Integrated Circuit (ASIC), or combinations thereof. Memory 96 can include Read Only Memory (ROM), volatile memory, and non-volatile memory, or combinations thereof, coupled to the bus using techniques known in the art. Camera 91, microphone(s) 92, speaker(s) 93, and display(s) 94 may be coupled to the bus.

Memory 96 can be connected to the bus and can include DRAM, a hard disk drive or a flash memory or a magnetic optical drive or magnetic memory or an optical drive or other types of memory systems that maintain data even after power is removed from the system. In one aspect, the processor 97 retrieves computer program instructions stored in a machine-readable storage medium (memory) and executes those instructions to perform operations described herein.

Audio hardware, although not shown, can be coupled to the one or more buses 98 in order to receive audio signals to be processed and output by speakers 93. Audio hardware can include digital to analog and/or analog to digital converters. Audio hardware can also include audio amplifiers and filters. The audio hardware can also interface with microphones 92

(e.g., microphone arrays) to receive audio signals (whether analog or digital), digitize them if necessary, and communicate the signals to the bus 98.

The network interface 95 may communicate with one or more remote devices and networks. For example, interface can communicate over known technologies such as Wi-Fi, 3G, 4G, 5G, Bluetooth, ZigBee, or other equivalent technologies. The interface can include wired or wireless transmitters and receivers that can communicate (e.g., receive and transmit data) with networked devices such as servers (e.g., the cloud) and/or other devices such as remote speakers and remote microphones.

It will be appreciated that the aspects disclosed herein can utilize memory that is remote from the system, such as a network storage device which is coupled to the audio processing system through a network interface such as a modem or Ethernet interface. The buses 98 can be connected to each other through various bridges, controllers and/or adapters as is well known in the art. In one aspect, one or more network device(s) can be coupled to the bus 98. The network device(s) can be wired network devices (e.g., Ethernet) or wireless network devices (e.g., WI-FI, Bluetooth). In some aspects, various aspects described (e.g., signal routing, sound field analysis, filter estimation, rendering, etc.) can be performed by a networked server in communication with one or more devices of the system.

Various aspects described herein may be embodied, at least in part, in software. That is, the techniques may be carried out in an audio processing system in response to its processor executing a sequence of instructions contained in a storage medium, such as a non-transitory machine-readable storage medium (e.g., DRAM or flash memory). In various aspects, hardwired circuitry may be used in combination with software instructions to implement the techniques described herein. Thus, the techniques are not limited to any specific combination of hardware circuitry and software, or to any particular source for the instructions executed by the audio processing system.

In the description, certain terminology is used to describe features of various aspects. For example, in certain situations, the terms “analyzer”, “router”, “renderer”, “estimator”, “transformer”, “combiner”, “synthesizer”, “controller”, “localizer”, “spatializer”, “component,” “unit,” “module,” “logic”, “extractor”, “subtractor”, “generator”, “optimizer”, “processor”, “mixer”, “detector”, “canceler”, “simulator”, “encoder”, and “decoder” are representative of hardware and/or software configured to perform one or more processes or functions. For instance, examples of “hardware” include, but are not limited or restricted to an integrated circuit such as a processor (e.g., a digital signal processor, microprocessor, application specific integrated circuit, a micro-controller, etc.). Thus, different combinations of hardware and/or software can be implemented to perform the processes or functions described by the above terms, as understood by one skilled in the art. Of course, the hardware may be alternatively implemented as a finite state machine or even combinatorial logic. An example of “software” includes executable code in the form of an application, an applet, a routine or even a series of instructions. As mentioned above, the software may be stored in any type of machine-readable medium.

Some portions of the preceding detailed descriptions have been presented in terms of algorithms and symbolic representations of operations on data bits within a computer memory. These algorithmic descriptions and representations are the ways used by those skilled in the audio processing arts to most effectively convey the substance of their work to others skilled in the art. An algorithm is here, and generally, conceived to be a self-consistent sequence of operations leading to a desired result. The operations are those requiring physical manipulations of physical quantities. It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of an audio processing system, or similar electronic device, that manipulates and transforms data represented as physical (electronic) quantities within the system’s registers and memories into other data similarly represented as physical quantities within the system memories or registers or other such information storage, transmission or display devices.

The processes and blocks described herein are not limited to the specific examples described and are not limited to the specific orders used as examples herein. Rather, any of the processing blocks may be re-ordered, combined, or removed, performed in parallel or in serial, as necessary, to achieve the results set forth above. The processing blocks associated with implementing the audio processing system may be performed by one or more programmable processors executing one or more computer programs stored on a non-transitory computer readable storage medium to perform the functions of the system. All or part of the audio processing system may be implemented as, special purpose logic circuitry (e.g., an FPGA (field-programmable gate array) and/or an ASIC (application-specific integrated circuit)). All or part of the audio system may be implemented using electronic hardware circuitry that include electronic devices such as, for example, at least one of a processor, a memory, a programmable logic device or a logic gate. Further, processes can be implemented in any combination hardware devices and software components.

While certain aspects have been described and shown in the accompanying drawings, it is to be understood that such aspects are merely illustrative of and not restrictive on the broad invention, and the invention is not limited to the specific constructions and arrangements shown and described, since various other modifications may occur to those of ordinary skill in the art. The description is thus to be regarded as illustrative instead of limiting.

To aid the Patent Office and any readers of any patent issued on this application in interpreting the claims appended hereto, applicants wish to note that they do not intend any of the appended claims or claim elements to invoke 35 U.S.C. 112(f) unless the words “means for” or “step for” are explicitly used in the particular claim.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

As previously explained, an aspect of the disclosure may be a non-transitory machine-readable medium (such as microelectronic memory) having stored thereon instructions, which program one or more data processing components (generically referred to here as a “processor”) to perform the spatial audio processing operations, network operations, and audio signal processing operations, as described herein. In other aspects, some of these operations might be performed by specific hardware components that contain hardwired logic. Those operations might alternatively be performed by any combination of programmed data processing components and fixed hardwired circuit components.

While certain aspects have been described and shown in the accompanying drawings, it is to be understood that such aspects are merely illustrative of and not restrictive on the broad disclosure, and that the disclosure is not limited to the specific constructions and arrangements shown and described, since various other modifications may occur to those of ordinary skill in the art. The description is thus to be regarded as illustrative instead of limiting.

In some aspects, this disclosure may include the language, for example, "at least one of [element A] and [element B]." This language may refer to one or more of the elements. For example, "at least one of A and B" may refer to "A," "B," or "A and B." Specifically, "at least one of A and B" may refer to "at least one of A and at least one of B," or "at least of either A or B." In some aspects, this disclosure may include the language, for example, "[element A], [element B], and/or [element C]." This language may refer to either of the elements or any combination thereof. For instance, "A, B, and/or C" may refer to "A," "B," "C," "A and B," "A and C," "B and C," or "A, B, and C."

What is claimed is:

1. A method comprising:

receiving a higher-order ambisonics (HOA) representation of a sound field that includes a first plurality of audio signals;

separating a second plurality of audio signals from the first plurality of audio signals, wherein the second plurality of audio signals are of a first-order ambisonics (FOA) representation of the sound field;

determining a plurality of adaptive filters based on at least some of the second plurality of audio signals;

producing a plurality of output audio signals based on the first plurality of audio signals and the plurality of adaptive filters, each output audio signal having at least a portion of the sound field; and driving a plurality of speakers using the plurality of output audio signals.

2. The method of claim 1, wherein producing the plurality of output audio signals comprises:

rendering the first plurality of audio signals to produce a plurality of speaker driver signals; and applying at least one of the plurality of adaptive filters to at least one of the plurality of speaker driver signals.

3. The method of claim 2 further comprising determining a speaker layout of the plurality of speakers, wherein the first plurality of audio signals are rendered according to the speaker layout.

4. The method of claim 3, wherein, when the speaker layout comprises headphones, rendering further comprises applying at least one spatial audio filter to each of the plurality of output audio signals.

5. The method of claim 1, wherein the plurality of adaptive filters are determined according to a speaker layout of the plurality of speakers.

6. The method of claim 1 further comprising performing a sound field analysis upon the second plurality of audio signals to determine one or more parameters associated with the sound field, wherein the plurality of adaptive filters are determined based on the least some of the second plurality of audio signals and the one or more parameters.

7. The method of claim 6, wherein the one or more parameters comprises at least one of a direction of arrival (DOA) associated with a sound source of the sound field, diffuseness of the sound field, reverberance of the sound field, and direct-to-ambience ratio of sound of the sound field.

8. The method of claim 1, wherein HOA representation of the sound field is of user-desired audio content, the method further comprises playing back, by an electronic device, the user-desired audio content through the plurality of speakers, wherein the receiving, separating, determining, producing, and driving are performed while the user-desired audio content is played back by the electronic device.

9. The method of claim 1, wherein the plurality of output audio signals is a first plurality of output audio signals, wherein the method further comprises:

determining that the plurality of adaptive filters are no longer to be determined;

in response, rendering the second plurality of audio signals to produce a second plurality of output audio signals; and driving the plurality of speakers using the second plurality of output audio signals in lieu of the first plurality of output audio signals.

10. The method of claim 9 is performed by at least one programmed processor of an electronic device, wherein the method further comprises determining a computational load on the electronic device, wherein determining that the plurality of adaptive filters are no longer to be determined comprises determining that the computational load is above a threshold.

11. An electronic device, comprising:

at least one processor; and memory having instructions stored therein which when executed by the at least one processor causes the electronic device to:

receive a higher-order ambisonics (HOA) representation of a sound field that includes a first plurality of audio signals;

extract a second plurality of audio signals from the first plurality of audio signals, wherein the second plurality of audio signals are of a first-order ambisonics (FOA) representation of the sound field;

determine a plurality of adaptive filters based on at least some of the second plurality of audio signals;

produce a plurality of output audio signals based on the first plurality of audio signals and the plurality of adaptive filters, each output audio signal having at least a portion of the sound field; and drive a plurality of speakers using the plurality of output audio signals.

12. The electronic device of claim 11, wherein the plurality of speakers are a part of the electronic device.

13. The electronic device of claim 11, wherein the electronic device is a first electronic device, wherein the instructions to drive the plurality of speakers comprises instructions to transmit the plurality of output audio signals to a second electronic device that comprises or is communicatively coupled to the plurality of speakers to cause the second electronic device to playback the plurality of output audio signals.

14. The electronic device of claim 11, wherein the instructions to produce the plurality of output audio signals comprises instructions to:

render the first plurality of audio signals to produce a plurality of speaker driver signals; and apply at least one of the plurality of adaptive filters to at least one of the plurality of speaker driver signals.

15. The electronic device of claim 11, wherein the memory has further instructions to perform a sound field analysis upon the second plurality of audio signals to determine one or more parameters associated with the sound field, wherein the plurality of adaptive filters are determined based on the least some of the second plurality of audio signals and the one or more parameters.

16. The electronic device of claim 15, wherein the one or more parameters comprises at least one of a direction of arrival (DOA) associated with a sound source of the sound field, diffuseness of the sound field, reverberance of the sound field, and direct-to-ambience ratio of sound of the sound field.

17. The electronic device of claim 11, wherein the plurality of output audio signals is a first plurality of output audio signals, wherein the memory has further instructions to:

determine a computational load on the electronic device;

in response to determining that the plurality of adaptive filters are no longer to be determined based on the computational load, render the second plurality of audio signals to produce a second plurality of output audio signals; and drive the plurality of speakers using the second plurality of output audio signals in lieu of the first plurality of output audio signals.

18. A processor of an electronic device configured to:

extract a first-order ambisonics (FOA) signal from a higher-order ambisonics (HOA) signal;

perform non-parametric spatial audio rendering upon the HOA signal to produce a plurality of spatially rendered audio signals;

perform parametric spatial audio processing upon the FOA signal to estimate one or more adaptive filters;

produce a plurality of output audio signals by applying the one or more adaptive filters upon the plurality of spatially rendered audio signals; and cause a plurality of speakers to playback the plurality of output audio signals.

19. The processor of claim 18, wherein performing the parametric spatial audio processing comprises performing a sound field analysis upon the FOA signal to determine one or more parameters associated with a sound field of the FOA signal, wherein the one or more parameters comprises at least one of a direction of arrival (DOA) associated with a sound source of the sound field, diffuseness of the sound field, reverberance of the sound field, and direct-to-ambience ratio of sound of the sound field, and wherein the one or more adaptive filters are determined based on the FOA signal and the one or more parameters.

20. The processor of claim 18, wherein the processor is configured to determine a computational load on the electronic device;

in response to determining that the computational load is greater than a threshold, cease performing the parametric spatial audio processing; and cause the plurality of speakers to playback the plurality of spatially rendered audio signals in lieu of the plurality of output audio signals.

* * * * *